United States Patent
Ge et al.

(10) Patent No.: US 10,836,178 B2
(45) Date of Patent: Nov. 17, 2020

(54) PRINTING FLUID CARTRIDGE WITH ELECTRODES AND METHOD TO THE LEVEL OF FLUID IN A PRINTING FLUID CARTRIDGE

(71) Applicant: HEWLETT-PACKARD DEVELOPMENT COMPANY, L.P., Spring, TX (US)

(72) Inventors: Ning Ge, Palo Alto, CA (US); Chien-Hua Chen, Corvallis, OR (US); Michael W. Cumbie, Corvallis, OR (US)

(73) Assignee: Hewlett Packard Develpment Company, L.P., Spring, TX (US)

( * ) Notice: Subject to any disclaimer, the term of this patent is extended or adjusted under 35 U.S.C. 154(b) by 0 days.

(21) Appl. No.: 16/316,921

(22) PCT Filed: Oct. 5, 2016

(86) PCT No.: PCT/US2016/055425
§ 371 (c)(1),
(2) Date: Jan. 10, 2019

(87) PCT Pub. No.: WO2018/067133
PCT Pub. Date: Apr. 12, 2018

(65) Prior Publication Data
US 2019/0232673 A1 Aug. 1, 2019

(51) Int. Cl.
*B41J 2/175* (2006.01)
*G01F 23/24* (2006.01)
*G01F 25/00* (2006.01)

(52) U.S. Cl.
CPC .......... *B41J 2/17566* (2013.01); *G01F 23/24* (2013.01); *G01F 23/241* (2013.01); *G01F 23/242* (2013.01); *G01F 25/0076* (2013.01); *B41J 2002/17579* (2013.01)

(58) Field of Classification Search
CPC .. G01F 23/242; G01F 25/0076; G01F 23/241; G01F 23/24; B41J 29/393; B41J 2/17566; B41J 2002/17569
See application file for complete search history.

(56) References Cited

U.S. PATENT DOCUMENTS

| 4,196,625 A | 4/1980 | Kern |
| 5,144,835 A | 9/1992 | McDonald |
| 6,431,670 B1 * | 8/2002 | Schantz ............... B41J 2/17566 347/7 |

(Continued)

FOREIGN PATENT DOCUMENTS

| EP | 1125748 A1 | 8/2001 |
| GB | 2509143 | 6/2014 |
| JP | H0564898 A | 3/1993 |

OTHER PUBLICATIONS

"Unraveling the Complexities of Level Detection"; May 16, 2006; http://www.controlglobal.com/assets/wp_downloads/pdf/turck_leveldetection.pdf.

*Primary Examiner* — Julian D Huffman
(74) *Attorney, Agent, or Firm* — Fabian VanCott (57) ABSTRACT

A sensing structure in an example may include at least three electrodes along an interior surface of a reservoir from a top portion of the reservoir to a bottom portion of the reservoir wherein at least one of the electrodes is closer to at least another electrode at the top portion of the reservoir than at the bottom portion of the reservoir.

19 Claims, 7 Drawing Sheets

(56) References Cited

U.S. PATENT DOCUMENTS

| | | |
|---|---|---|
| 6,539,797 B2 | 4/2003 | Livingston et al. |
| 6,634,229 B1 * | 10/2003 | Kazkaz .................. G01F 23/24 |
| | | 340/620 |
| 7,556,326 B2 | 7/2009 | Knierim et al. |
| 7,909,444 B2 | 3/2011 | Oomura |
| 2007/0076024 A1 | 4/2007 | Jeong et al. |
| 2010/0082271 A1 | 4/2010 | McCann et al. |
| 2014/0174173 A1 * | 6/2014 | Chamberlin ............ G01F 23/24 |
| | | 73/304 R |

* cited by examiner

START

↓

Selectively apply a sense signal to each of at least three electrodes defined on an interior surface of a printing fluid reservoir
705

↓

Compare a detected sense signal between each of a two-electrode pair among the at least three electrodes
710

↓

Determine a consensus measurement among the each of the two-electrode pairs via a processor
715

↓

END

*Fig. 7*

PRINTING FLUID CARTRIDGE WITH ELECTRODES AND METHOD TO THE LEVEL OF FLUID IN A PRINTING FLUID CARTRIDGE

BACKGROUND

Printing devices eject printable fluid onto print media in order to form an image or a structure on the print media. The printable fluid may be stored in a reservoir or other volume from which a printing device draws the printable fluid. Over time, the level or amount of printable fluid within the reservoir is depleted.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Printing devices utilize printing fluid reservoirs and cartridges to maintain a level of printing fluid therein. Sensing the level of printing fluid within the printing fluid reservoir is conducted so that the printing device does not attempt to print without printing fluid. Operation of, for example, an ink jet or other type of printing device without printing fluid can damage the printing device's printhead as well as other components of the printing devices.

In thermal ink jet printing devices, for example, printing is performed by boiling printing fluid within a firing chamber defined in the printhead and ejecting the printing fluid through a nozzle fluidly coupled to the firing chamber. If a printing processes were to be conducted without the printing fluid, the printhead—a complex electro-mechanical system containing hundreds of nozzles, heating elements, barriers, ink flow channels, and underlying circuits—would be irreparably damaged.

Recently produced printheads are being built as reusable units. The printheads are able to last beyond the depletion of the supply of printing fluid within the printing fluid reservoir associated with the printhead. Because the printhead is relatively expensive as compared to the printing fluid, it is becoming increasingly common to replenish the printing fluid rather than to discard the printhead. For this reason, printing without printing fluid should be avoided so as to avoid damaging the printhead.

Additionally, operation of a printing device with a depleted printing fluid supply may lead to loss of information. For example, a printing device printing a facsimile message may receive the transmitted information and operate as if the received information is being printed. If the printing fluid is depleted, the information is never printed. Unless the receiver can ask the sender to retransmit the fax, the information is irretrievable.

Knowing a more precise printing fluid level within the printing fluid reservoir furthers other considerations as well. For instance, before beginning a relatively large print job, it would be useful to know whether the remaining printing fluid is sufficient to finish the print job. If the amount of printing fluid is insufficient, the printing fluid reservoir can be replaced or replenished to avoid wasting time, paper, and effort of unsuccessfully attempting to print the large print job.

The present specification, therefore describes a sensing structure including at least three electrodes along an interior surface of a reservoir from a top portion of the reservoir to a bottom portion of the reservoir wherein at least one of the electrodes is closer to at least another electrode at the top portion of the reservoir than at the bottom portion of the reservoir.

The present specification further describes a printing fluid cartridge including a housing defining a printing fluid reservoir and at least three electrodes each extending along a height of the printing fluid reservoir wherein at least two of the electrodes diverge from each other the further down the height of the printing fluid reservoir.

The present specification further describes a method of detecting a level of fluid in a container including selectively applying a sense signal to each of at least three electrodes defined on an interior surface of a printing fluid reservoir, comparing a detected sense signal between each of a two-electrode pair among the at least three electrodes, and determining a consensus measurement among the each of the two-electrode pairs via a processor.

As used in the present specification and in the appended claims, the term "printing fluid" is meant to be understood as any fluid that may be applied to a media.

Further, as used in the present specification and in the appended claims, the term "three-dimensional polytope" is meant to be understood broadly as any polytope that is three dimensional and when formed out of a material can contain a fluid such as printing fluid.

Even still further, as used in the present specification and in the appended claims, the term "a number of" or similar language is meant to be understood broadly as any positive number comprising 1 to infinity.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Figure 1:
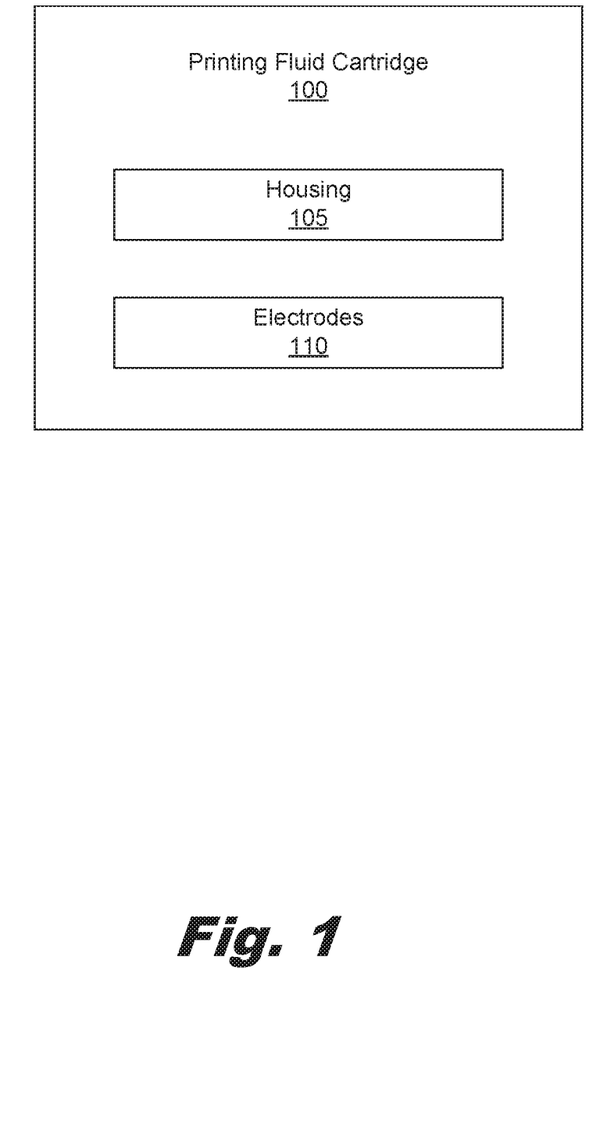
FIG. 1 is a block diagram of a printing fluid cartridge according to one example of the principles described herein.

Turning now to the figures, FIG. 1 is a block diagram of a printing fluid cartridge (100) according to one example of the principles described herein. The printing fluid cartridge (100) may be implemented in an electronic device such as a printing device. Examples of printing devices include desktop printing devices, ink jet printing devices, among other types of printing devices.

The printing fluid cartridge (100) may be utilized in any of the above described printing devices and within any data processing scenario including, stand-alone hardware, mobile applications, through a computing network, or combinations thereof. Further, the printing fluid cartridge (100) may be utilized in any of the above described printing devices and within in a computing network, a public cloud network, a private cloud network, a hybrid cloud network, other forms of networks, or combinations thereof.

To achieve its desired functionality, the printing fluid cartridge (100) comprises various hardware components. Among these hardware components may be a housing (105) defining a printing fluid reservoir (110) and a number of electrodes (110). Additionally, the cartridge may include or be communicatively coupled to a processor to provide instructions to apply a sense signal to at least one of the number of electrodes (110) and receive a signal from at least one of the electrodes (110) representative of a sensed resistance or conductance. Each of these will be described in more detail below.

The housing (105) may be any type of housing capable of holding an amount of printing fluid within a printing fluid reservoir defined in the housing. Although the present example describes a housing (105) defining a fluid reservoir within a printing fluid cartridge (100), other examples are contemplated by the present application. Thus, the present application further contemplates the use of a printing fluid reservoir fluidly coupled to a printhead, but not physically coupled to a housing associated with that printhead. In this example, the housing defining the printing fluid reservoir may comprise the below described electrodes (110).

In the example where the printing fluid cartridge (100) comprises the housing (105) as shown in FIG. 1, a printhead may be incorporated into the housing (105). The printhead may be fluidly coupled to the printing fluid reservoir and be supplied with an amount of printing fluid from the reservoir. The printing fluid may be fed to the printhead via gravitational feed or via some other mechanical devices from the printing fluid reservoir.

The shape of the printing fluid cartridge (100) may vary depending on the printing device implementing the printing cartridge (100). In an example, the shape of the printing fluid cartridge (100) may be a three-dimensional polytope including three-dimensional polyhedrons. In an example, faces or walls of the polytopes may intersect forming an angle between them. In an example, faces or walls of the polytopes may curve towards each other forming curved corners and edges. In an example, the portion of the housing (105) defining a printing fluid reservoir may be a rectangular cuboid. In an example, the portion of the housing (105) defining a printing fluid reservoir may be a rectangular cuboid with rounded corners and edges.

The shape of the housing (105) defining a printing fluid reservoir may be varied. However, the variance of the shape of the housing (105) defining a printing fluid reservoir is not influenced by the layout of the electrodes (110) described below. Instead, as will be described in more detail below, the electrodes (110) described herein may be used in any shape or size of housing (105) such that the shape of the housing (105) is not dependent on the layout of the electrodes (110) and the electrodes do not dictate how the housing should be formed in order to allow the electrodes (110) to have a relatively higher sensitivity.

The electrodes (110) may be formed on an interior surface of the housing (105) defining the printing fluid reservoir. In an example, the number of electrodes (110) is three. However, the number of electrodes (110) may be three or more. As will be described in more detail below, the number of electrodes (110) is greater than two electrodes (110) in order to provide a consensus measurement among the each of the two-electrode pairs among the at least three electrodes. In an example, the electrodes (110) are electrically conductive metal traces that extend from a high printing fluid level to a low printing fluid level within the printing fluid reservoir. Thus, the printing fluid reservoir may not be completely filled with printing fluid while the level of the printing fluid is still in physical contact with the electrodes (110).

The electrodes (110) are arranged in a general bell-shaped formation where a portion of at least one of the electrodes (110) is closer to another electrode (110) towards a top portion of the housing (105) defining the printing fluid reservoir and further apart towards a bottom portion of the housing (105) defining the printing fluid reservoir. In an example the distance between two of the electrodes (110) increase in a gradient manner such that the distance between any two of the electrodes (110) constantly increases the further down, from the top portion to the bottom portion of the housing (105) the electrodes (110) travel. In an example the distance between two of the electrodes (110) diverge from each other in a stepped manner such that the distance between any two of the electrodes (110) periodically increases the further down, from the top portion to the bottom portion of the housing (105), the electrodes (110) travel. In an example the distance between two of the electrodes (110) diverge from each other in a gradient-stepped hybrid manner such that the distance between any two of the electrodes (110) periodically gradiently increases the further down, from the top portion to the bottom portion of the housing (105), the electrodes (110) travel.

As mentioned above, the electrodes (110) are made of electrically conductive material that can be patterned. The electrodes (110) need not be very thick. Instead, the electrodes (110) may be as thin as practically possible while still being capable of conducting an electrical charge. In an example, the electrodes (110) may be applied on the housing (105) as a conductive paint. In an example, the electrodes (110) may be formed into the housing (105) defining the printing fluid reservoir using laser direct structuring (LDS) technology. LDS is a process that uses a thermoplastic material, doped with a metal-plastic additive activated via a laser. A laser writes the course of the electrodes (110) on the interior surface of the plastic housing (105). Where the laser beam hits the plastic, the metal additive forms a micro-rough track. The metal particles of this track form a nucleation point for a subsequent metallization process. In an example, the metallization process includes a copper bath where a conductor path is formed from successive layers being laid down precisely on the tracks for the electrodes (110). Successively layers of copper, nickel and/or gold finish can be raised in this way to form the electrodes (110). In an example, a three-dimensional (3D) printing processes may also be used. In this example, hetero-material (e.g., metal and polymer) may be used to form the desired design of the electrodes (110). Other processes may also be conducted such as layering a dielectric over the electrodes (110).

During operation of the printing fluid cartridge (100), the level of the printing fluid within the printing fluid reservoir defined by the housing (105) may be detected by applying a sense signal to at least one of the electrodes (110). The sense signal may be an AC signal or a DC square wave signal. The specific frequency of the sense signal may be chosen with relatively broad latitude but may be chosen based on the type and content of the printing fluid and the area on which the electrodes (110) are placed, among other considerations.

A signal may then be detected at a second electrode (110) of the pair. The detected signal at the second electrode (110) is different than the sense signal applied to the first electrode (110) due to various factors. For example, the sense signal travels the distance between the first electrode (110) and the second electrode (110). The detected signal may depend upon the electrical properties of the metal used to form the electrodes (110). Furthermore, the sense signal is altered due to the amount and the electrical properties of the printing fluid within the printing fluid reservoir. When DC voltage is applied, the printing fluid within the printing fluid reservoir may be characterized as presenting resistance circuits to the sense signal. When AC voltage is applied, the reservoir appears as a Resistance-Capacitance ("RC") circuits to the sense signal.

Figure 2:
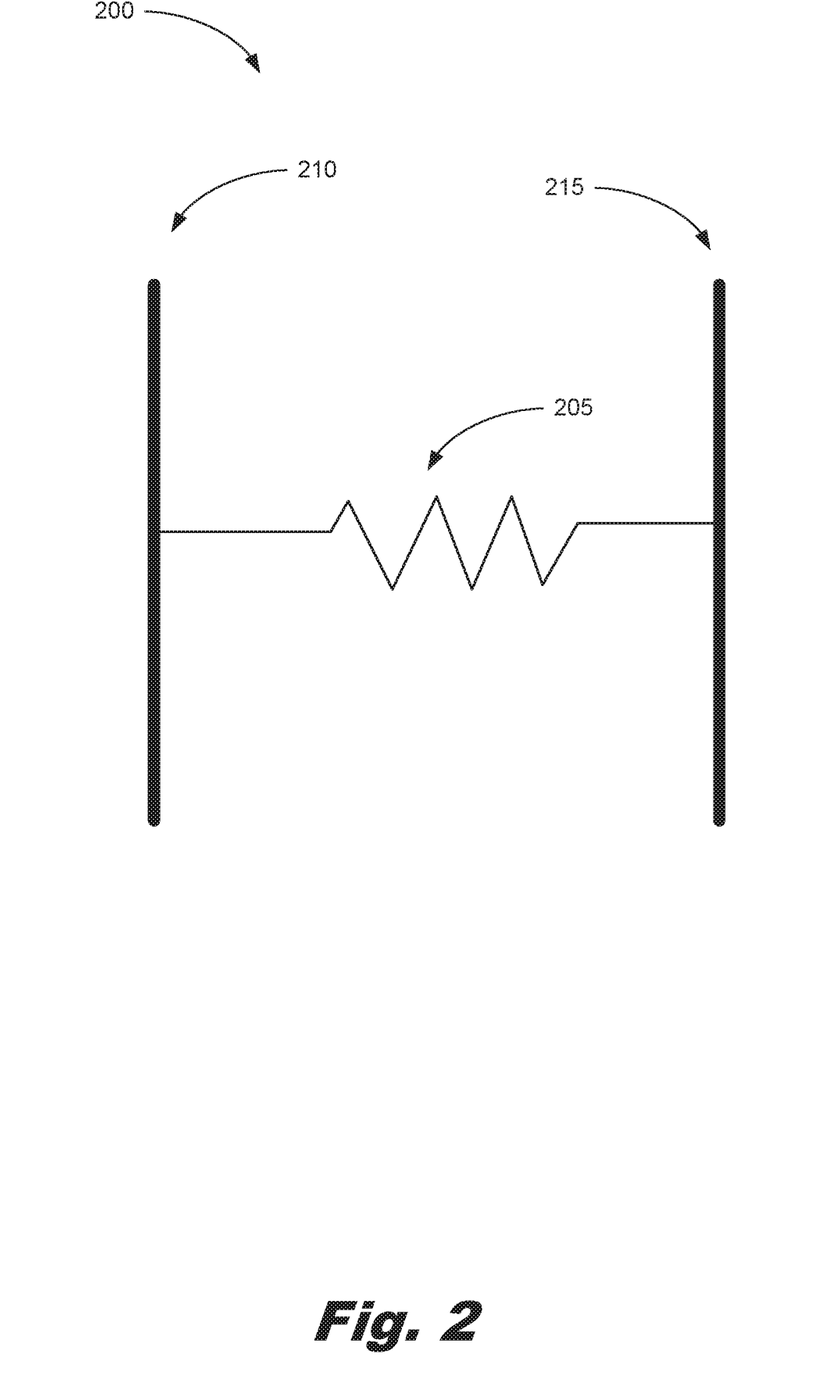
FIG. 2 is a circuit diagram illustrating electrical characteristics of a printing fluid in a printing fluid reservoir of the printing fluid cartridge of FIG. 1, according to one example of the principles described herein.

FIG. 2 is a circuit diagram illustrating electrical characteristics of the printing fluid in the printing fluid reservoir of the printing fluid cartridge (FIG. 1, 100) according to an example of the principles described herein. The printing fluid cartridge (FIG. 1, 100) can be analogized as a resistance circuit (200). A resistance is formed between the first electrode (210) and the second electrode (215) as represented by a resistor (205).

The resistance of the printing fluid reduces the current flow between the first electrode (210) and the second electrode (215) and causes a voltage drop between electrodes (210, 215). When the printing fluid is depleted, the printing fluid in the printing fluid reservoir acts as an open circuit with the resistor (205) having theoretically an infinite value. On the other hand, when the printing fluid reservoir is full of printing fluid, the printing fluid reservoir has the lowest resistance. The exact, numerical value for the "lowest resistance value" of the resistor (205) depend upon various factors some of which are listed above, and can be obtained by experimental or other methods.

Figure 3:
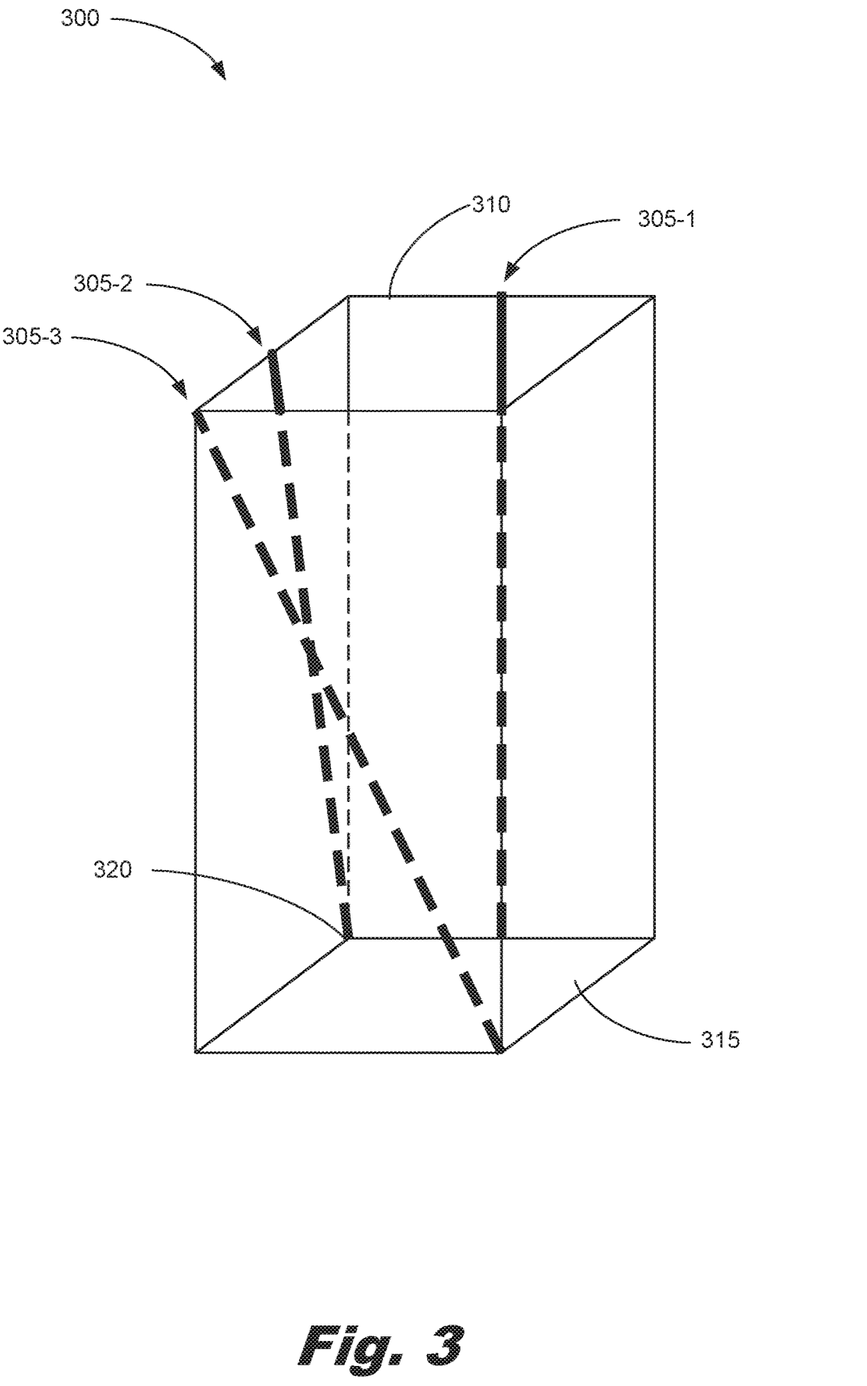
FIG. 3 is a perspective view of a sensing structure according to an example of the principles described herein.

FIG. 3 is a perspective view of a sensing structure (300) according to an example of the principles described herein. In the example shown in FIG. 3, the sensing structure (300) has three electrodes (305-1, 305-2, 305-3) defined within a reservoir. As described above, the sensing structure may sense or detect the level of a printing fluid held within the reservoir. A first electrode (305-1) may run the entire height of the reservoir. The first electrode (305-1) may run from a mid-point at the top (310) of the reservoir to a mid-point at the bottom (315) of the reservoir. In an example, the first electrode (305-1) may run less than the entire height of the reservoir but higher than the intended level of printing fluid placed in the reservoir. As can be seen in FIG. 3, the first electrode (305-1) is shown in dashed lines where a surface of the reservoir housing prevents the view of the first electrode (305-1).

A second electrode (305-2) may run the entire height of the reservoir similar to that of the first electrode (305-1). However, the second electrode (305-2) may run from a mid-point at the top (310) of the reservoir to a corner point (320) of the reservoir (300). A third electrode (305-3) may run the entire height of the reservoir similar to that of the first electrode (305-1). However, the third electrode (305-3) may run from a corner of one of the sides of the reservoir to another corner of the side of the reservoir.

The sensing structure (300) shown in FIG. 3 comprises at least two of the three electrodes (305-1, 305-2, 305-3) that diverge from one another as each of the electrodes (305-1, 305-2, 305-3) progresses down their respective walls of the reservoir. In this example, the second electrode (305-2) diverges from the third electrode (305-3) the further each of the electrodes (305-2 and 305-3) progresses down their respective walls of the reservoir. Further, the distance between the third electrode (305-3) and the first electrode (305-1) increases the further each of the electrodes (305-1 and 305-3) progresses down their respective walls of the reservoir. As briefly described above, the divergence of one of the electrodes (305-1, 305-2, 305-3) from another of the electrodes (305-1, 305-2, 305-3) provides for a better slope resolution during a low printing fluid situation within the reservoir. Indeed, where printing fluid is low, a printing fluid meniscus formed around the electrodes (305-1, 305-2, 305-3) may influence the conductance of the printing fluid and accordingly alter the perceived level of printing fluid in the reservoir. With the at least three electrodes (305-1, 305-2, 305-3) are formed within the sensing structure (300) as shown in FIG. 3, the resistance of the printing fluid, and the corresponding level of printing fluid in the reservoir is compared between the three individual pairs of electrodes (305-1, 305-2, 305-3).

Although FIG. 3 shows specific layouts of the three electrodes (305-1, 305-2, 305-3) within the reservoir, these are merely meant to be examples. Thus the present specification contemplates a use of parallel, converging, and diverging electrodes in a single reservoir. Additionally, the number of electrodes may vary and may include 3 or more electrodes. Further, as will be described below, a comparison of the resistances between any two electrodes (305-1, 305-2, 305-3) may be conducted even where a pair of electrodes converge, diverge, and/or are parallel between each other. Thus, the present specification contemplates any number of electrodes exceeding two in any layout where at least two electrodes diverge from each other.

During operation, a comparison of the resistances between the first electrode (305-1) and second electrode (305-2) pair, the first electrode (305-1) and third electrode (305-3) pair; and the second electrode (305-2) and the third electrode (305-3) pair is made. The resistances from each of these pairs are compared to each other to determine if a consensus resistance is present. If all three resistances are similar, then a consensus is made and the level of printing fluid represented by the resistance detected may be determined by a processor associated with the sensing structure (300) and reported to a user of the reservoir sensing structure (300). If any of the two detected resistances are not similar to each other, a consensus among the three pairs may be used to produce the detected printing fluid level as described above. In an example, the consensus may be developed by determining if two of either of the three pairs have similar resistances. If so, then the two concurring resistance values are used as the detected printing fluid level. In an example, the consensus may be developed by averaging out the values of resistance detected by each pair and using that average resistance value to determine the printing fluid level as described above. Alternatively, if all three detected resistance values are not in agreeance with each other, then a processor associated with the sensing structure (300) may determine that this is indicative of defective electrodes (305-1, 305-2, 305-3) and provide a warning to a user of the sensing structure (300) stating that the electrodes (305-1, 305-2, 305-3) have been determined to be defective and that the sensing structure (300) should be replaced.

The above examples describe the use of a direct current (DC) power supply with the electrodes (305-1, 305-2, 305-3) in order to determine a resistance of the printing fluid in the reservoir (300). Although a DC power supply may be used in this way to determine the printing fluid level in the reservoir (300), an alternating current (AC) power supply may also be used similarly to detect the inductance of the printing fluid in the sensing structure (300) in a similar way. Thus, throughout the specification herein, although the detection of the printing fluid level in the sensing structure (300) is couched in terms of a resistance, it is understood that the present examples may also be described in terms of an inductance detected using an AC power supply as well.

Figure 4:
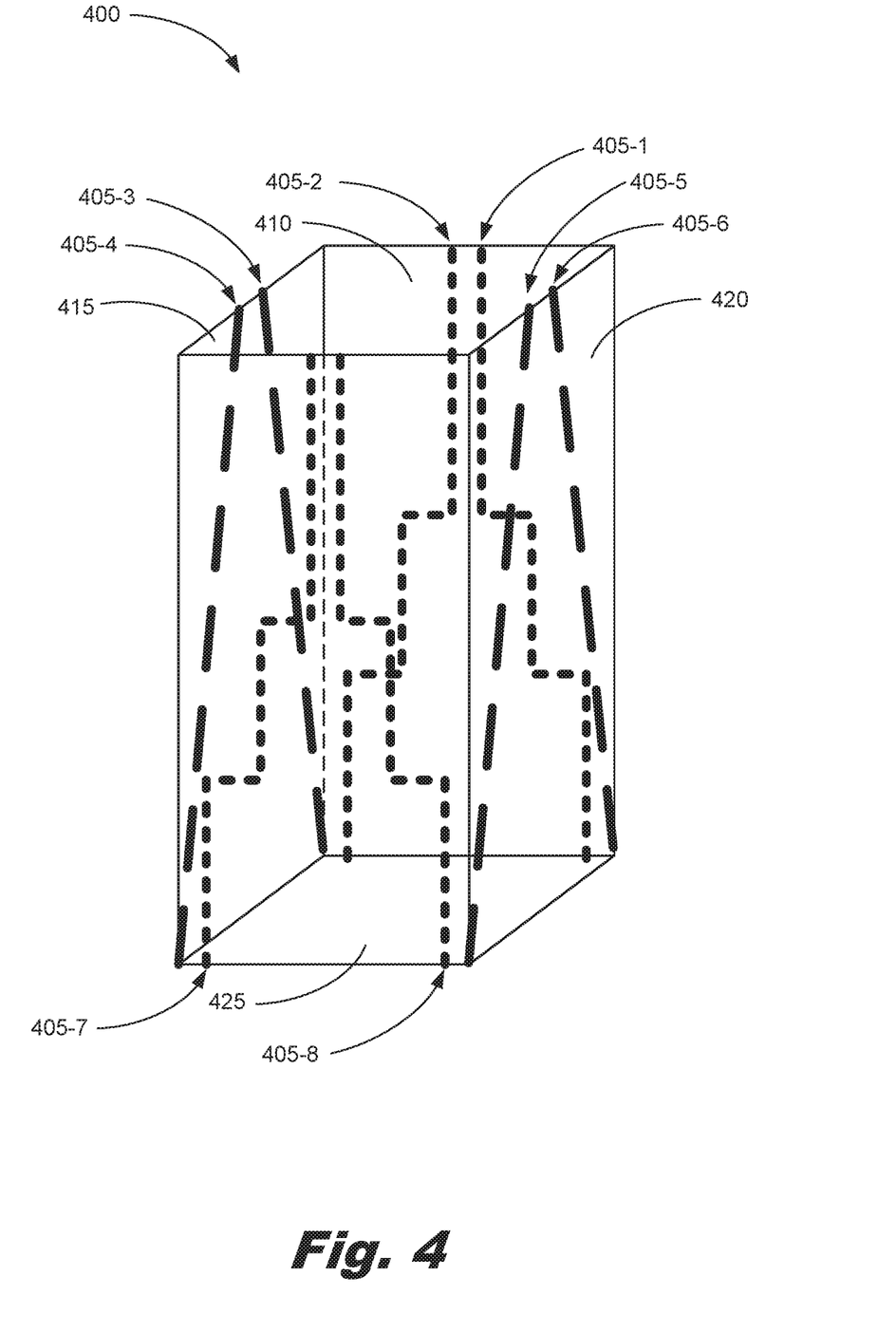
FIG. 4 is a perspective view of a reservoir according to an example of the principles described herein.

FIG. 4 is a perspective view of a reservoir (400) according to an example of the principles described herein. In the example shown in FIG. 3, the reservoir (400) has eight electrodes (405-1, 405-2, 405-3, 405-4, 405-5, 405-6, 405-7, 405-8). Each of the eight electrodes (405-1, 405-2, 405-3, 405-4, 405-5, 405-6, 405-7, 405-8) may run the entire height of the reservoir (400) similar to the electrodes (305-1, 305-2, 305-3) of FIG. 3. However, some of the eight electrodes (405-1, 405-2, 405-7, 405-8) may be formed along a wall of the reservoir (400) in a stepped fashion as shown. In this example, the stepped electrodes (405-1, 405-2, 405-7, 405-8) may form resistive zones where a portion of the stepped electrodes (405-1, 405-2, 405-7, 405-8) run vertically and parallel to each other a certain distance down the wall of the reservoir (400). Certain portions of the stepped electrodes (405-1, 405-2, 405-7, 405-8) may run horizontally and parallel to each other a certain distance down the wall of the reservoir thereby creating the stepped electrodes (405-1, 405-2, 405-7, 405-8).

In the example shown in FIG. 4, the eight electrodes (405-1, 405-2, 405-3, 405-4, 405-5, 405-6, 405-7, 405-8) may be paired up to form 4 pairs of electrodes (405-1, 405-2, 405-3, 405-4, 405-5, 405-6, 405-7, 405-8). In an example, a first pair of electrodes (405-1, 405-2) may be formed on a first wall (410) of the reservoir (400). A second pair of electrodes (405-3, 405-4) may be formed on a second wall (415) of the reservoir (400). A third pair of electrodes (405-5, 405-6) may be formed on a third wall (420) of the reservoir (400). A fourth pair of electrodes (405-7, 405-8) may be formed on a fourth wall (425) of the reservoir. Each of these pairs of electrodes (405-1, 405-2; 405-3, 405-4; 405-5, 405-6; and 405-7, 405-8) may each detect a resistance of the printing fluid in the reservoir (400) individually and provide the detected resistance to a processor associated with the reservoir (400) as described above. The processor may then compare the detected resistance values from each pair of electrodes (405-1, 405-2; 405-3, 405-4; 405-5, 405-6; and 405-7, 405-8) to determine if a consensus resistance among the pairs of electrodes (405-1, 405-2; 405-3, 405-4; 405-5, 405-6; and 405-7, 405-8) is present. As described above, where one resistance value, for example, is not similar to the other three, that value may be thrown out and the other three values are determined to be the correct value of resistance to use in determining the printing fluid level in the reservoir. Again, where no consensus is present among the detected resistance values, the processor may provide a warning to a user or a printing device indicating that the eight electrodes (405-1, 405-2, 405-3, 405-4, 405-5, 405-6, 405-7, 405-8) are defective and the reservoir (400) should be replaced or repaired.

Although FIGS. 3 and 4 show a three electrode (305-1, 305-2, 305-3) layout and an eight electrode (405-1, 405-2, 405-3, 405-4, 405-5, 405-6, 405-7, 405-8) layout respectively, these are meant to merely be examples. The present specification contemplates the use of any number of electrodes exceeding two. The present specification further contemplates any number of electrodes in any configuration:
straight, stepped, gradient, and/or stepped-gradient hybrid as will be discussed below. The examples provided herein all describe at least three electrodes (305-1, 305-2, 305-3, 405-1, 405-2, 405-3, 405-4, 405-5, 405-6, 405-7, 405-8) that, among them, include at least two electrodes that diverge from each other the further down the reservoir (400) they progress. This forms a bell shaped space design between the at least two electrodes that provides for better ink level sensitivity at low printing fluid conditions. As the printing fluid begins to be depleted, the detected resistance of the printing fluid begins to be increased and the sensitivity of the electrodes increases due to the wider distance between the at least two electrodes.

Although the electrodes (305-1, 305-2, 305-3, 405-1, 405-2, 405-3, 405-4, 405-5, 405-6, 405-7, 405-8) described above are depicted as being formed on a single side or wall of the reservoir (400), this is meant as an example and in not meant to be limiting. The present specification contemplates electrodes (305-1, 305-2, 305-3, 405-1, 405-2, 405-3, 405-4, 405-5, 405-6, 405-7, 405-8) that may be formed on a first wall of the reservoir (300, 400) at the top and as they progress down the interior surface of the reservoir (400) they may be formed on a second wall of the reservoir (400). This may result in the electrodes (305-1, 305-2, 305-3, 405-1, 405-2, 405-3, 405-4, 405-5, 405-6, 405-7, 405-8) traversing a corner of the reservoir (400).

Figures 5A, 5B, 5C:
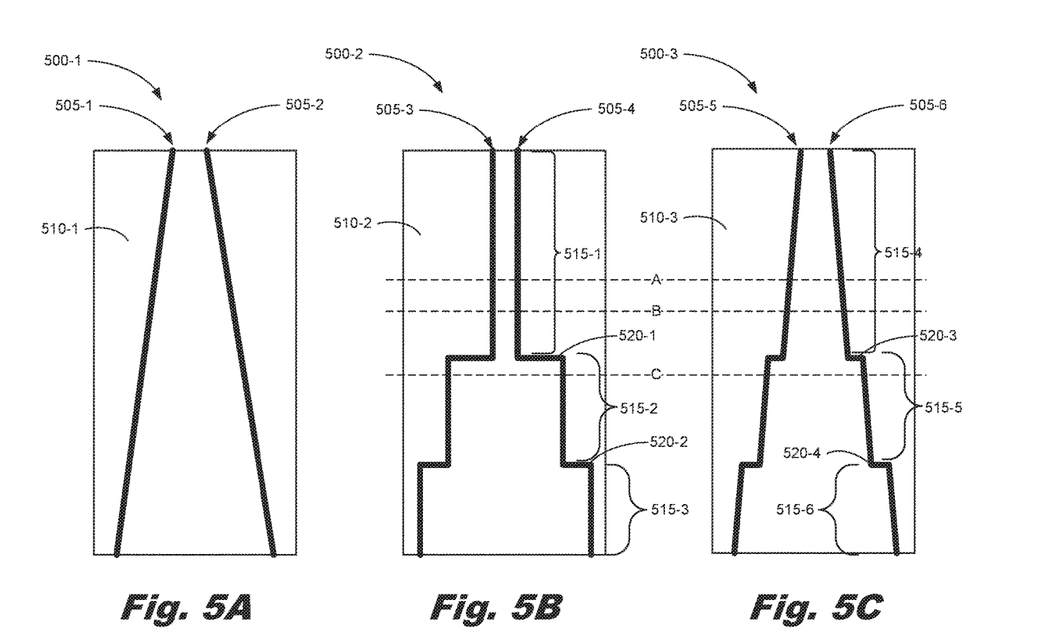
FIGS. 5A-5C are side views of electrodes within the reservoir of FIG. 3 according to an example of the principles described herein.

FIGS. 5A-5C are side views of electrodes within the reservoir of FIG. 3 according to an example of the principles described herein. Each of the examples in FIGS. 5A-5C show a number of electrodes formed on a single wall of the reservoir (500). However, this is not meant to indicate that two electrodes exist within the reservoir, but the present specification instead contemplates the use of three or more electrodes in order to compare resistance values amongst them as described above.

In the example shown in FIG. 5A, a first electrode (505-1) and second electrode (505-2) of the at least three electrodes in the reservoir (500-1) are formed on the wall (510-1) of the reservoir (500-1) in a gradient fashion. The first electrode (505-1) runs from the top of the wall (510-1) to the bottom at a slanted angle while the second electrode (505-2) also runs from the top of the wall (510-1) to the bottom at an opposite slant such that the two electrodes (505-1, 505-2) are closer together at the top of the wall (510-1) while further apart at the bottom of the wall (510-1). As described above, when the printing fluid is low and a sense signal is applied to one of the electrodes (505-1, 505-2), the detected resistance at the opposite electrode (505-1, 505-2) is more sensitive due to the greater distance between the electrodes (505-1, 505-2) at the bottom of the reservoir (500-1). The relatively greater sensitivity at the bottom of the reservoir (500-1) overcomes any issues with failing to detect printing fluid amounts in low printing fluid conditions within the reservoir (500-1).

In the example shown in FIG. 5B, a third electrode (505-3) and a fourth electrode (505-4) of the at least three electrodes in the reservoir (500-2) are formed on the wall (510-2) of the reservoir (500-2) in a stepwise fashion as shown. An electrode that is formed into a stepwise fashion may be described as an electrode that has vertical portions as to the height of the reservoir (510-2) as well as horizontal portion as the height of the reservoir (510-2). This results in 90° turns along the path of the electrode as it progresses down the surface of the wall (510-2). Again, the distance between the third electrode (505-3) and fourth electrode (505-4) increases as each of them progress down the wall (510-2) of the reservoir (500-2). With the stepwise fashion of the electrodes (505-3, 505-4), a number of zones may be formed between the lands of the steps.

A first zone (515-1) may be formed between the top of the reservoir (500-2) and a first land (520-1) of the formed electrodes (505-3, 505-4). A second zone (515-2) may be formed between the first land (520-1) and a second land (520-2). Additionally, a third zone (515-3) is created between the second land (520-2) and the bottom of the reservoir (500-2). As a result, the sensitivity of the electrodes (505-3, 505-4) is segmented such that the third zone (515-3) is relatively more sensitive than the second zone (5115-2) and the second zone (515-2) is relatively more sensitive than the first zone (515-1).

In the example shown in FIG. 5C, a fifth electrode (505-5) and a sixth electrode (505-6) of the at least three electrodes in the reservoir (500-3) are formed on the wall (510-3) of the reservoir (500-3) in a hybrid gradient-stepwise fashion. The hybrid gradient-stepwise fashion combines the features of those electrodes (505-1, 505-2, 505-3, 505-4) in FIGS. 5A and 5B to have intermittent lands and gradiently formed electrodes (505-5, 505-6). This provides for three zones (515-4, 515-5, 515-6) to be formed with an additional feature of having a resulting gradient output in the sensed resistance of the printing fluid between the lands (520-3, 520-4). In either FIG. 5B or 5C, abrupt changes in the resistive measurement can be used to determine exact level of the fluid in the reservoir (500-2, 500-3). These abrupt changes occur at the lands (520-1-520-4) formed in the electrodes (505-3-505-6). For example, the printing fluid level falls from level "A" to level "B", there would be a relatively proportional change in the detected signal based on the distance between the two respective electrodes. However, when the ink level falls from level "B" to level "C", the change in the detected signal is abrupt. Such abrupt changes can be recognized by a processor which may detect the exact level of the printing fluid in the reservoir (500-2, 500-3) since the precise location of the change in the width of the electrodes (505-3-505-6) is known.

Figure 6:
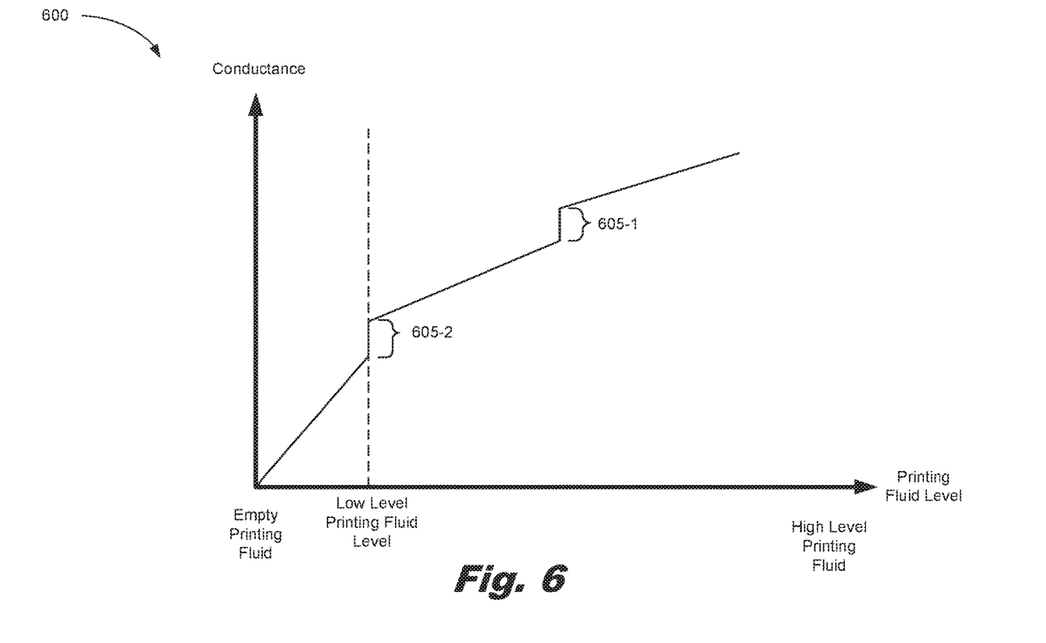
FIG. 6 is a graph showing the abrupt detected changes in resistance through the printing fluid and electrodes of FIGS. 5B and 5C according to an example of the principles described herein.

FIG. 6 is a graph (600) showing the abrupt detected changes in resistance through the printing fluid and electrodes of FIGS. 5B and 5C according to an example of the principles described herein. The graph shows the conductance or registered signal of the above described electrodes versus the printing fluid level. As the printing fluid level decreases within the reservoir the conductance of the printing fluid generally decreases. However, the graph shows two points (605-1, 605-2) where the abrupt change described above in connection with FIGS. 5A and 5B. Specifically, a first point (605-1) represents the point where the printing fluid level crosses the first lands (520-1, 520-3) of their respective electrodes (505-3-505-6). The change in sensitivity of the electrodes at this location due to the further separation of the electrodes (505-3-505-6) prevents a relatively more drastic drop in the resistance signal but results in a steeper angle in conductance thereafter. Similarly, a second point (605-2) represents the point where the printing fluid level crosses the second lands (520-2, 520-4) of their respective electrodes (505-3-505-6). Again, the sensitivity of the electrodes (505-3-505-6) is increased due to the further separation of the electrodes (505-3-505-6) resulting in a relatively more drastic angle of conductance as the printing fluid depletes. Accordingly, however, a resistance/conductance signal is still detected down to a point where the printing fluid is completely depleted.

As describe above, a processor associated with the reservoir may be provided with the sense signal and convert that sensed signal into a representative printing fluid amount. The processor may monitor the detected printing fluid ink levels and send appropriate warnings or signals to a user device to inform a user of the amount of the printing fluid. For example, a warning may be sent to a user of a printing device in which the reservoir is fluidly coupled to in order stating that a low printing fluid condition is present in the reservoir. In another example, the processor may send a similar warning when the processor has determined that the amount of printing fluid present in the reservoir will not satisfy the printing requirements of a particular print job sent to the printer by a user. In a further example, the processor may warn the user that, based on non-concurring resistive signals from the pairs of electrodes, the electrodes are defective and the reservoir or cartridge housing the reservoir should be repaired or replaced.

Figure 7:
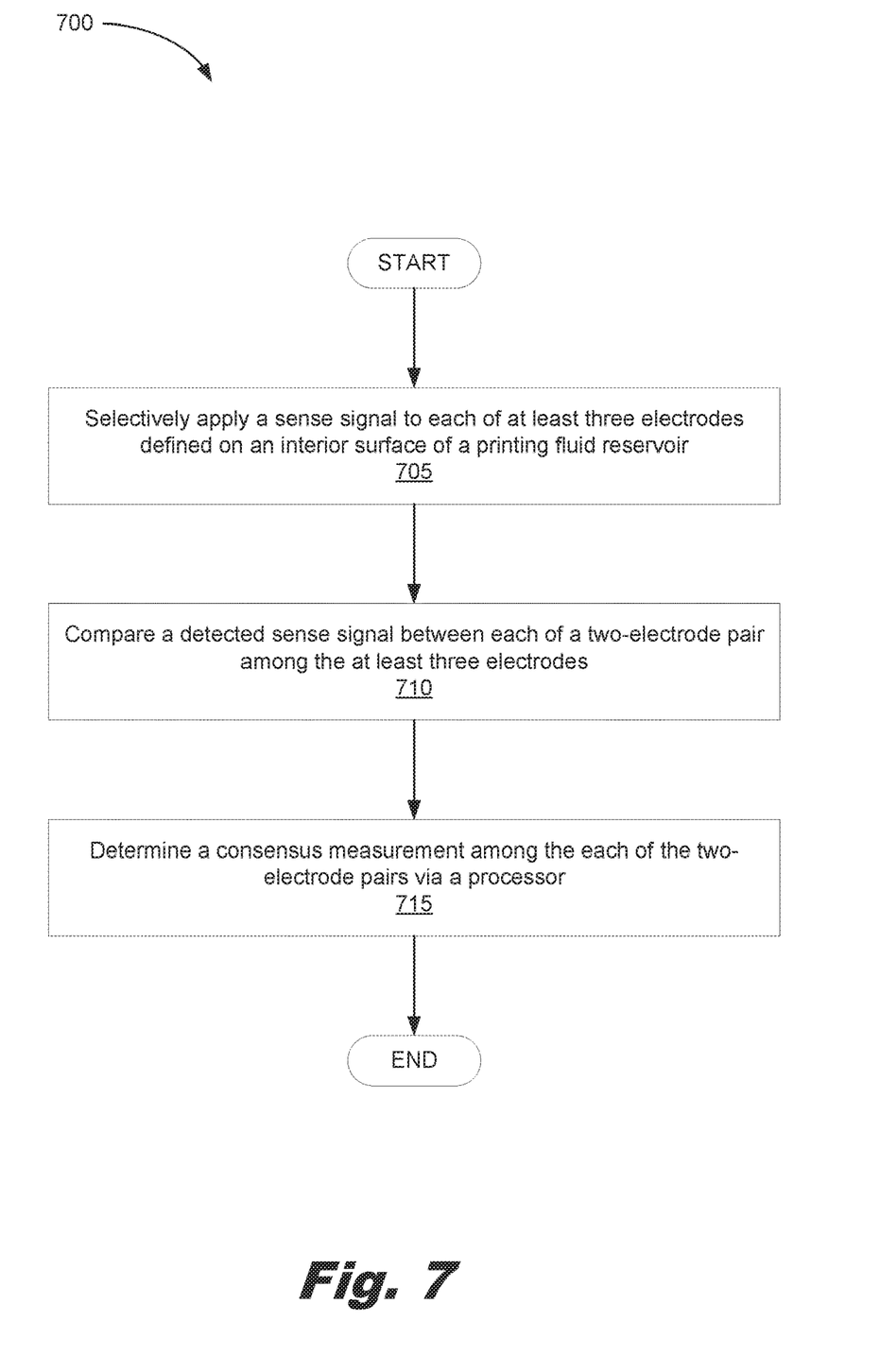
FIG. 7 is a flowchart showing a method of detecting a level of fluid in a container according to one example of the principles described herein.

FIG. 7 is a flowchart showing a method (700) of detecting a level of fluid in a container according to one example of the principles described herein. The method (700) may begin with selectively applying (705) a sense signal to each of at least three electrodes defined on an interior surface of a printing fluid reservoir. As described above, the sense signal may be provided to one of two paired electrodes using either an AC or DC power source. The other of the paired electrodes is then sensed for a voltage indicating the resistance or impedance of the printing fluid between the two paired electrodes.

The method (700) may continue with comparing (710) the detected sense signal between each of a two-electrode pair among the at least three electrodes. As described above, the comparison (710) is conducted by a processor associated with the reservoir. This comparison may be among any number of pairs of electrodes present and defined along the wall of the reservoir.

The method (700) may continue with determining (715) a consensus measurement among the each of the two electrode pairs via a processor. This determination of a consensus (715) among the pairs may result in a number of outcomes ranging from providing a user, via a graphical user interface, a detected amount of printing fluid to presenting a warning to the user regarding the health of the reservoir and repair or replacement instructions.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor associated with the reservoir or print cartridge or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a reservoir or print cartridge that comprises a number of electrodes to detect the level of printing fluid within the reservoir. The electrodes as arranged in the present specification provide for relatively higher sensitivity of printing fluid level detection than would straight electrodes. The bell shaped form of the two electrodes of the as least three electrodes provides for increased sensitivity as the printing fluid is depleted from the reservoir. Additionally, because there are three or more electrodes, the voltage sensed by any pair among the at least three electrodes may be compared to other sensed voltages as described in order to determine if a consensus among the electrodes is detected. Based on the results, a more accurate and reliable level of printing fluid may be determined.

The preceding description has been presented to illustrate and describe examples of the principles described. This description is not intended to be exhaustive or to limit these principles to any precise form disclosed. Many modifications and variations are possible in light of the above teaching.

What is claimed is:

1. A reservoir with a fluid level sensor, comprising:
   at least three electrodes defined on an interior surface of the reservoir from a top portion of the reservoir to a bottom portion of the reservoir;
   wherein at least one of the electrodes is closer to at least another electrode at the top portion of the reservoir than at the bottom portion of the reservoir; and,
   in the fluid level sensor, a processor programmed to detect a resistance or inductance between each two-electrode pair among the at least three electrodes and determine a consensus measurement of a fluid level in the reservoir based on comparing the resistance or inductance between each of the two-electrode pairs among the at least three electrodes.

2. The reservoir of claim 1, wherein the at least one of the electrodes slope away from at least another electrode in a gradient manner.

3. The reservoir of claim 1, wherein the at least one of the electrodes diverge away from at least another electrode in a stepped manner.

4. The reservoir of claim 3, wherein the stepped manner forms a number of resistive zones through a printing fluid within the reservoir.

5. The reservoir of claim 1, wherein the at least one of the electrodes diverge away from at least another electrode in a hybrid stepped and gradient manner.

6. The fluid reservoir of claim 1, the processor to apply a direct current sense signal to the electrodes and detect resistance between each two-electrode pair among the at least three electrodes.

7. The fluid reservoir of claim 1, the processor to apply an alternating current sense signal to the electrodes and detect inductance between each two-electrode pair among the at least three electrodes.

8. The fluid reservoir of claim 1, wherein the electrodes are formed of conductive paint.

9. The fluid reservoir of claim 1, wherein at least one of the electrodes traverses around a corner of the reservoir.

10. A printing fluid cartridge, comprising:
    a housing defining a printing fluid reservoir; and
    at least three electrodes each having a length extending along a height of the printing fluid reservoir;
    wherein at least two of the electrodes diverge from each other the further down the height of the printing fluid reservoir;
    wherein the diverging electrodes diverge from each other down the height of the printing fluid reservoir in steps such that a distance between the diverging electrodes increases at each such step spaced down the height of the printing fluid reservoir; and
    a processor programmed to detect a resistance or inductance between each two-electrode pair among the at least three electrodes and determine a consensus measurement of a fluid level in the reservoir based on comparing the resistance or inductance between each of the two-electrode pairs among the at least three electrodes.

11. The printing fluid cartridge of claim 10, wherein each of the at least three electrodes are formed on an interior surface of the printing fluid cartridge.

12. The printing fluid cartridge of claim 11, wherein the electrodes are formed using laser direct structuring.

13. The printing fluid cartridge of claim 10, wherein the number of electrodes is eight.

14. The printing fluid cartridge of claim 10, wherein each of the diverging electrodes diverge from each other further down the height of the printing fluid reservoir in a gradient fashion in between the steps.

15. The printing fluid cartridge of claim 10, wherein the printing fluid reservoir has a three-dimensional polytope shape.

16. A method of operating a reservoir for detecting a level of fluid, the reservoir, comprising at least three electrodes defined along an interior surface of the reservoir from a top portion of the reservoir to a bottom portion of the reservoir, wherein at least one of the electrodes is closer to at least another electrode at the top portion of the reservoir than at the bottom portion of the reservoir,
    the method comprising:
    selectively applying a sense signal to each of the at least three electrodes defined on the interior surface of the reservoir, the reservoir containing a printing fluid;
    comparing a detected sense signal between each of a two-electrode pair among the at least three electrodes; and
    determining a consensus measurement among the two-electrode pairs via a processor.

17. The method of claim 16, wherein the printing fluid reservoir has a three-dimensional polytope shape and wherein the at least three electrodes comprise eight electrodes with two electrodes paired on each side of the printing fluid reservoir.

18. The method of claim 17, wherein the providing a consensus measurement among the each of the two-electrode pairs to a processor comprises providing a consensus measurement among the two paired electrodes on each side of printing fluid reservoir.

19. The method of claim 16, wherein determining a consensus measurement among the two-electrode pairs, further comprises, with the processor, issuing an alert that the reservoir needs replacement when no consensus measurement is determined.

* * * * *